Patented Nov. 6, 1945

2,388,543

UNITED STATES PATENT OFFICE 2,388,543

PROCESS OF PREPARING PLASTER CASTS

Gilbert A. Hoggatt, Snyder, N. Y., assignor to Certain-teed Products Corporation, New York, N. Y., a corporation of Maryland No Drawing. Application April 2, 1942, Serial No. 437,413

7 Claims. (Cl. 106—114)

This invention relates to processes of producing casts of gypsum plaster. By the term gypsum plaster in connection with the invention is meant gypsum from which has been removed part or all of the water of crystallization and which is in condition to take up water of crystallization and set. The invention particularly relates to a process of producing casts from calcined gypsum, that is calcium sulphate hemihydrate.

Gypsum plasters, particularly calcined gypsum, are used for making casts in the form of molds, statuary, decorative objects and ornamental casts for building and other uses. They are also used as molding plasters for application to frames or supports to form molds and for making patterns and models. For such purposes the plaster is gaged with water to the consistency of a mortar or of a slurry suitable for filling the mold or working into form. In such uses and others of similar nature it is desirable that the cast or the applied plaster shall be hard and smooth, strong and tough to withstand rough handling and to resist breaking under shock as well as to resist surface damage which would mar the surface thereof.

In other uses gypsum plasters are required to provide a structure in the cast which will afford acoustical properties or a porous structure for reduced weight. In acoustical tiles, for example, it is desirable to have a strong body for the tile while providing light weight and high acoustical properties by virtue of the cellular structure thereof. In gypsum wallboard also, it is desirable that the core of set calcined gypsum between the cover papers shall be of light weight while at the same time being of sufficient strength, rigidity and hardness.

In some uses for construction purposes it is desirable that the set product shall be of low weight and high strength; also that it shall provide a smooth surface when trowelled or otherwise formed or molded so that painting or other finishing may be applied thereto without undue absorption of the paint or applied material.

For various of the above purposes many proposals heretofore have been made involving the incorporation in gypsum plasters, particularly calcined gypsum, of various materials, such as gum arabic, dextrine, borax, and cooked or gelatinized starch. These ingredients have been added for the most part for the purpose of producing a hard surface upon the cast. It also has been proposed heretofore to incorporate in gypsum plasters ingredients tending to reduce the amount of water required to produce a given consistency in order to limit the amount of voids left upon the evaporation of the water, thus effecting an increase in the strength of the cast. Some of the ingredients intended for increasing strength or hardness, especially the cooked starches, have required solution or suspension thereof in such large amounts of water for incorporation in the mortar or slurry that the desired improvement in strength or other mechanical property has not been satisfactory.

Where gypsum plasters have been used for making casts having acoustical properties, the strength of the cast has particularly been limited because the acoustical properties acquired by virtue of the cellular structure of the cast necessitate a limited amount of strength providing material for a given size piece. This cellular structure is accomplished in various ways, such as incorporating with the plaster materials capable of forming a gas upon gaging of the plaster with water or, by incorporating in the slurry a foam or foam forming materials, which foam will have sufficient stability to persist until the cast is set thus to entrap the air or gas in the set structure. Casts formed by all such methods, therefore, are inherently relatively weak.

It is an object of the invention to produce casts of gypsum plaster for any of the above and for other purposes which will have the improved strength, hardness, rigidity, toughness, while also having substantial resiliency and capacity to absorb shock without breaking. These improvements are accomplished while at the same time producing the desired density, porosity, or other characteristics for the particular purpose.

It is a particular object of the invention to produce casts from ordinary gypsum plasters modified by simple incorporation of common ingredients to secure the desired result.

It is a further object of the invention to provide a simple process of treating gypsum casts to secure the desired high strength, hardness, rigidity, toughness, resiliency, and capacity to absorb shock without breaking.

To accomplish these objects I may use any gypsum plaster which is ordinarily suitable for making casts for molds, decorative objects, wallboard and other purposes mentioned above. Ordinarily such plasters will not contain any substantial amount of retarder because for casting purposes it is desirable that the cast shall set within a relatively short time after forming. In some cases, however, a small amount of commercial retarder or other retarder such as potassium citrate or tartaric acid, may be used if desired. On the other hand, in some cases it may be desirable to accelerate the setting time somewhat and for this purpose may be used such accelerators as ground raw gypsum, potassium sulphate, zinc sulphate or others.

It is desirable, however, in most cases, particularly where acoustical properties or a porous structure for other purpose are not desired, that a gypsum plaster of low water carrying capacity shall be used in order that the amount of water necessary to produce the mortar or slurry from the plaster shall not be excessive. For the purposes of this phase of the invention plasters having water carrying capacities between 30 and 55 may be used. Such low water carrying capacities may be used in making other products, such as acoustical tile or the manufacture of wallboard when means are adopted to produce the cellular structure or voids in the cast such as those hereinabove referred to. For such porous or light weight products, however, in some cases plasters of water carrying capacity up to 80 may be used.

In all such products it is found, according to the invention, that the physical and mechanical properties may be improved, particularly strength, resiliency, and capacity to absorb shock without breaking. This improvement is accomplished according to the invention by incorporating raw starch in the dry plaster, or if desired, in the gaging water, so that the starch in this raw or ungelatinized state is present in the mortar or slurry and therefore in the cast made therefrom. When the mortar or slurry made from such a mixture is allowed to set the cast is then subjected to a temperature which will gelatinize the raw starch. The physical characteristics of the cast thus produced and treated are modified to a marked degree as compared with casts of the base gypsum plaster. These physical characteristics may be measured by tests for tensile strength, compressive strength and indentation tests, as well as by empirical tests such as dropping the object on a hard surface, breaking by hand, and other usual methods. It is a particular feature of the invention that the gelatinization of the starch occurs in the cast, that is in situ, after the cast has been formed and preferably after it is set. This feature affords particular advantage as compared with prior art practices of incorporation of gelatinized starches in gypsum plasters. As in the invention the raw starch is incorporated with the dry plaster or with the gaging water, the amount of water necessary to effect mixing to form a mortar or slurry is very much less than would be required with an equal quantity of starch which has been gelatinized. For example, it is possible to make a slurry with the raw starch which is of pouring consistency, approximating that of thick cream, by mixing one part by weight of water to one part by weight of the raw starch. To secure any substantial degree of fluidity and particularly to secure a pouring consistency with ordinary starch the amount of water which will be required when, prior to mixing with the water, the starch is gelatinized would be of the degree of 15 parts by weight of the water to one part by weight of the starch. Even though a "thin boiling" starch were used the amount of water required for pouring consistency would be not less than 4 parts to one of the starch. Limitation of the water used as proposed according to the invention limits or prevents the reduction in the strength, resiliency and resistance to shock which is experienced with casts of calcined gypsum when made with a large amount of water.

A further important feature of the invention lies in the control of the mixing of the dry materials, that is the gypsum plaster and the raw starch. Such control is important in some cases in order that the increase in the mechanical and physical properties shall be insured or that optimum improvement shall be obtained. This control is accomplished by simple steps. The plaster containing the raw starch, for example, may be mixed with water in the usual manner to form a mortar or slurry. The mixing may be continued until the dry materials are thoroughly wetted or until the usual homogeneous mixture is obtained as a mortar or slurry. It is important, however, particularly with larger amounts of raw starch in the mixture, that the mixing shall not be continued substantially beyond the point where noticeable stiffening of the mixture takes place due to the beginning of crystallization of the gypsum plaster in setting. The mixing may be stopped, however, in some cases as soon as the dry materials are uniformly wetted and well before any appearance of the stiffening occurs. The phenomenon of stiffening and particularly the beginning of stiffening is well known in the art and the point at which stiffening starts is readily recognizable to those experienced in making casts from mortars and slurry of gypsum plaster.

In another phase the invention provides that the gypsum plaster may be mixed with raw starch in amounts substantially in the range between ¼% and 15%, based upon the sum of these two ingredients of the composition plaster. When the composition plaster containing raw starch within such range is mixed with water to form a mortar or slurry, or when a suitable commercial gypsum plaster ordinarily available for molding and casting purposes is mixed with a water suspension of raw starch so as to secure the proportions above stated, it is possible to obtain the improved results of the invention by heating the casts made from such composition plaster or with such ingredients to the gelatinizing temperature of the starch. Within the scope of the invention in this phase such results may be obtained with or without the control of the mixing above referred to with respect to the stiffening point.

In making plaster casts for many purposes, however, the amount of raw starch substantially in the range above given may be particularly effective when the mixing is carried to but not substantially beyond the point where stiffening begins. Moreover, by limiting the amount of the starch used substantially to the range given the cost of making the casts, with the substantial improvement in the mechanical properties as above referred to, is kept low while avoiding defects caused apparently by shrinkage of the starch content or by loss of the water carried thereby.

For the purpose of effecting gelatinization of the starch I may place the cast when set in a bath of cold water and bring this bath to the temperature at which the starch in the cast will gelatinize. When casts are thus heated in a bath of water some action of the water upon the surface and edges of the cast takes place which produces pitting of the surface and dulling of corners and edges. This action interferes with obtaining a smooth surfaced cast and one which has sharp detail. In certain cases, however, for example, in the production of acoustical tile where it is desirable that the surface shall be porous and that the cells shall not be closed over by a surfacing film of the material, this action is not detrimental. It is also possible to secure the improvement by placing the set cast in water substantially at or above the gelatinizing temperature. In some cases this may be more convenient, although with some plasters and relatively large proportions of starch distortion and disruption of the cast and other defects may occur.

A preferable method is to subject the cast to an atmosphere containing water vapor in sufficient amount to prevent such drying out of the casts as would remove therefrom the water requisite for gelatinizing the starch. While in some cases it may be possible to effect the gelatinization by means of an atmosphere having a wet bulb temperature somewhat below the usual temperature of gelatinization of the starch used in the cast, it is considered that an atmosphere having a wet bulb temperature substantially equal to or greater than the temperature of gelatinization will be most effective to produce complete gelatinization in the cast. Thus it is possible, according to the invention, to effect gelatinization in an unsaturated atmosphere, such as may be provided by moist, heated air or gas, to afford the requisite wet bulb temperature and heat for breaking open the starch granules.

In practice, however, because of the ease of handling steam, it usually will be preferable to effect gelatinization in steam at atmospheric pressure, normally 212° F. or somewhat above. In certain cases it may be desirable, and such practice is within the scope of the invention, to produce a saturated steam atmosphere at pressures below atmospheric pressure, that is, under vacuum at temperatures below the normal 212° F. Where it is desirable to hasten the gelatinization steam at pressures substantially above atmospheric pressure to secure a temperature higher than 212° F. may be used. For expeditious processing, as well as for assurance of uniformity of the improved product, steaming the casts is the preferred method when the amount of the starch is maintained in the range ¼% to 15% as above stated. When this method of steaming is used, however, improved results may be secured with the amounts of starch in the range 15% to 30% based on the sum of the starch and base plaster. This higher range of starch content may be more suitable for the more porous products such as acoustical tile and the casts also appear to resist disruption and surface defects more than those subjected to submersion in the water bath.

Starches in general, however, gelatinize at a temperature ranging between 140° and 180° F. The temperature of the surrounding medium, whether it be a water bath or a vapor atmosphere, ordinarily will be required to be not substantially less than 140° F. As many of the common starches gelatinize at a temperature of 160° to 170° F., it will be apparent that the temperature of the atmosphere or of the bath for such common starches ordinarily should be not substantially less than 160° F. Such temperature, however, as above indicated, preferably will be substantially above the actual gelatinizing temperature of the starch used in order to secure rapid heating of the cast and completion of the treatment for physical improvement in a minimum of time, as well as to insure full gelatinization of each starch grain throughout the body of the cast. With a higher temperature of the medium all portions of the interior of the cast may be raised to the gelatinization temperature of the starch for a sufficient time to insure complete gelatinization throughout the cast.

*Table I*

| Plaster, percent | Starch, percent | W/P ratio | Tensile strength | Compressive strength | Lbs. per cu. ft. |
|---|---|---|---|---|---|
| 100 | | 70 | 343 | 2,533 | 69.5 |
| 99¾ | ¼ | 70 | 410 | 2,425 | 69.0 |
| 98 | 2 | 70½ | 508 | 3,033 | 67.9 |
| 95 | 5 | 72 | 550 | 3,266 | 65.8 |
| 85 | 15 | 77 | 701 | 3,288 | 60.3 |
| 75 | 25 | 82½ | 796 | 3,066 | 55.7 |
| 85 | 15 | 77 | 231 | 1,450 | 60.2 |

Tensile strength and compressive strength taken on the dry cast in pounds per square inch.

Illustrative of the improvement which it is possible to obtain in the practice of the invention, in Table I are given the results of tests upon a series of casts made by preparing a slurry of "Sunflower" molding plaster, a commercial molding plaster manufactured by Certain-teed Products Corporation, New York city, and Argo corn starch, a commercial raw starch manufactured by Corn Products Refining Company, New York, N. Y. At the left of the table are shown the amounts of the molding plaster and of the raw starch utilized for each test. The plaster and starch were mixed dry and gaged with water in the amounts sufficient to produce a pouring consistency approximately that of thick cream. All were mixed to the same consistency tested by means of a simple consistency tester. The water plaster ratio required to obtain this consistency is shown in Table I. Briquets of standard size were prepared for tensile strength tests and casts in the form of 2" cubes were prepared for tests of compressive strength. These 2" cubes were also used to determine the weight per cubic foot of the dry cast. The casts were allowed to set hard. They were then placed in a covered vessel on a wire mesh platform to hold the casts above the level of boiling water in the vessel. The casts were held in the steam atmosphere thus created for a period of about 30 minutes when they were removed and thereafter dried to constant weight at room temperature.

In the first line of Table I for purposes of comparison is shown the tensile and compressive strength tests and the weight per cubic foot of casts made entirely of "Sunflower" molding plaster without raw starch at a water plaster ratio of 70 without heating. It will be noted from the table that the water plaster ratio increases with increased amounts of starch. This is characteristic of the addition of a comminuted material, such as the raw corn starch powder, to a gypsum plaster. It will be noted, however, that a substantial improvement in the strength of the cast containing the starch is secured when the cast has been subjected to the steaming operation above described. In the last line of the table for further comparison a test is given for a cast containing 15% of starch without heating to effect gelatinization.

While Table I does not show tests for frangibility, hardness, resilience or other marked properties, observations were made showing that casts made with compositions similar to those given in the table could be subjected to various kinds of mechanical abuse without damage thereto. Small plaques of about ¼" thickness were found to be very difficult to break in the hand as compared with similar plaques made with "Sunflower" molding plaster alone. It was also found that the surface indentation with the finger nail or a pointed instrument was more difficult. Dropping a plaque or cast upon a hard surface caused breaking in only a few casts made according to the invention as compared with casts of "Sunflower" molding plaster alone. When the casts are struck with a hammer they do not shatter easily or break into pieces as do ordinary gypsum casts. Dents in the cast are made by the hammer head in a manner similar to those produced in wood by a hammer stroke. While extremely hard blows will break the cast it is highly resistant to this and similar rough treatment. Under compression the cast crushes with many lines of fracture and with the pieces interlocked and clinging together when the higher amounts of starch are used.

Similar results have been obtained with other starches such as tapioca flour, wheat flour and potato starch. In Table II are shown the results of tests made on similar briquets and cubes with 85% of "Sunflower" molding plaster and with these different starches, using 15% of starch in each case. These results are comparable to the test on "Sunflower" molding plaster alone as indicated in the first line of Table I. It will be noted that substantial increase in strength is secured with these other starches although the casts were somewhat less dense because of using a somewhat higher water plaster ratio.

*Table II*

| Kind of starch | W/P ratio | Tensile strength | Compressive strength | Lbs. per cu. ft. | Cast steamed |
|---|---|---|---|---|---|
| Tapioca | 75 | 749 | 3,266 | 59.7 | 30 min. |
| Wheat | 88 | 517 | | | 25 min. |
| Potato | 78½ | 602 | 3,066 | 59.8 | 30 min. |
| Wheat | 88 | 179 | | | Not heated. |

*Table III*

| Plaster, percent | Starch, percent | W/P ratio | Tensile strength | Compressive strength | Lbs. per cu. ft. |
|---|---|---|---|---|---|
| 100 | | 40 | 603 | 5,333 | 91.1 |
| 85 | 15 | 45 | 863 | 4,450 | 76.5 |

The plaster used for this test was that described in the patent to Harry F. Gardner #1,996,372. The cast without starch was tested without steaming. The cast containing starch was steamed for 38 minutes.

| Plaster, percent | Starch, percent | W/P ratio | Tensile strength | Compressive strength | Lbs. per cu. ft. |
|---|---|---|---|---|---|
| 100 | | 44 | 640 | | |
| 95 | 5 | 47 | 986 | | |

The plaster used for this test was that described in the patent to Randel and Dailey #1,901,051. The cast without starch was tested without steaming. The cast containing starch was steamed for 32 minutes.

Comparable improvement also was obtained by the process of the invention when utilizing low water carrying capacity gypsum plasters. In Table III are shown tests on two low water carrying gypsum plasters and the improvement in strength by the addition of starch. The substantial improvement indicated in strength as compared with the base plaster without the starch ingredient is marked in both cases and is significant because these two plasters are themselves high strength plasters.

While it is preferable to carry out the process of the invention by allowing the cast containing the raw starch to set before effecting gelatinization of the starch, within the scope of the invention the gelatinization may be effected before the cast is set. Thus, the slurry made of the plaster and the raw starch may be poured in the mold and while remaining therein it may be heated to the gelatinizing temperature to effect gelatinization of the starch content. With certain plasters, by the use of suitable retarder setting of the slurry may be delayed until after gelatinization has been completed or carried to such a point that the action of the gelatinized starch will be effective when the cast is fully set. Also within the scope of the invention the plaster and the starch as a dry mixture may be wetted with water sufficient only to permit tamping of the wetted mass in the mold. If such an amount of water is not sufficient to provide for full gelatinization of the starch content of the mix, water may be added to the tamped mass to the required extent and the mass then subjected to heating as in a steam atmosphere in order to effect gelatinization. If the water content of the mix is still below that necessary to effect setting of the mass, additional water may be added, and the cast then allowed to set.

Having thus described my invention I now claim:

1. Process of preparing casts of gypsum plaster which comprises gaging with water a mixture of raw starch and gypsum plaster to form a mortar or slurry, said gypsum plaster being in predominant amount to constitute the main settable ingredient of said mixture, the amount of the raw starch being substantially in the range between ¼% and 25% based on the sum of the weights of the gypsum plaster and the raw starch, continuing the mixing operation until the dry materials are thoroughly wetted by the water but not substantially beyond the point where stiffening starts, allowing the mixture to set to form a cast, and heating said cast to the temperature for gelatinizing the starch in the presence of moisture to prevent drying thereof which would interfere with the gelatinization.

2. Process of preparing casts of gypsum plaster which comprises gaging with water a mixture of raw starch and gypsum plaster to form a mortar or slurry, said gypsum plaster being in predominant amount to constitute the main settable ingredient of said mixture, the amount of the raw starch being substantially in the range between ¼% and 25% based on the sum of the weights of the gypsum plaster and the raw starch, continuing the mixing operation until the dry materials are thoroughly wetted by the water but not substantially beyond the point where stiffening starts, allowing the mixture to set to form a cast, and heating said cast to the temperature for gelatinizing the starch while subjecting said cast to an atmosphere containing moisture at a wet bulb temperature not substantially less than the gelatinizing temperature of the starch.

3. Process of preparing casts of gypsum plaster which comprises mixing with water raw starch and a gypsum plaster to form a mortar or slurry, said gypsum plaster being in predominant amount to constitute the main settable ingredient of said mixture, the amount of the raw starch being substantially in the range between ¼% and 25% based on the sum of the weights of the gypsum plaster and the raw starch, continuing the mixing operation until the dry materials are thoroughly wetted by the water but not substantially beyond the point where stiffening starts, allowing the mixture to set to form a cast, and subjecting said cast to an atmosphere of steam at a temperature not substantially less than the gelatinizing temperature of the starch utilized.

4. Process of preparing gypsum plaster casts which comprises gaging with water gypsum plaster and raw starch to form a mortar or slurry, said gypsum plaster being in predominant amount to constitute the main settable ingredient of said mixture, the amount of the raw starch being substantially in the range between ¼% and 25% based on the sum of the weights of the gypsum plaster and the raw starch, allowing the mixture to set, and heating said set mixture in an atmosphere containing water vapor at a wet bulb temperature not substantially less than the gelatinizing temperature of the starch.

5. Process of preparing gypsum plaster casts which comprises gaging with water gypsum plaster and raw starch to form a mortar or slurry, said gypsum plaster being in predominant amount to constitute the main settable ingredient of said mixture, the amount of the raw starch being substantially in the range between ¼% and 25% based on the sum of the weights of the gypsum plaster and the raw starch, allowing the mixture to set, subjecting said set mixture to an atmosphere of saturated steam at a temperature not substantially less than the gelatinizing temperature of the starch.

6. Process of preparing gypsum plaster casts which comprises mixing together a gypsum plaster in condition to take up water of crystallization, raw starch substantially in the range between ¼% and 15% based on the sum of the weights of the gypsum plaster and the starch and water to form a mortar or slurry, allowing said mixture to set, heating said set mixture to the temperature for gelatinizing the starch in the presence of sufficient moisture to prevent drying of the cast which would interfere with the gelatinization.

7. Process of preparing casts of calcined gypsum which comprises mixing with water raw starch and calcined gypsum, the amount of the raw starch being substantially in the range between ¼% and 25% based on the sum of the weights of the calcined gypsum and the raw starch, continuing the mixing operation until the dry materials are thoroughly wetted by the water but not substantially beyond the point where stiffening starts, allowing the mixture to set to form a cast, and heating said cast to the temperature for gelatinizing the starch while subjecting the cast to moisture to prevent drying thereof which would interfere with the gelatinization.

GILBERT A. HOGGATT.